May 14, 1968  W. H. LARSON  3,383,082
DEPENDING RETRACTABLE MIRROR
Filed Jan. 24, 1966  2 Sheets-Sheet 1
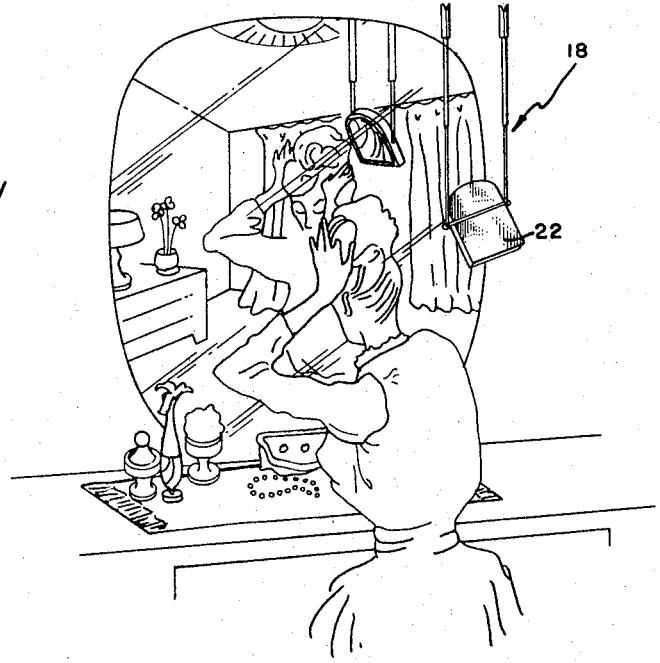
FIG. 1
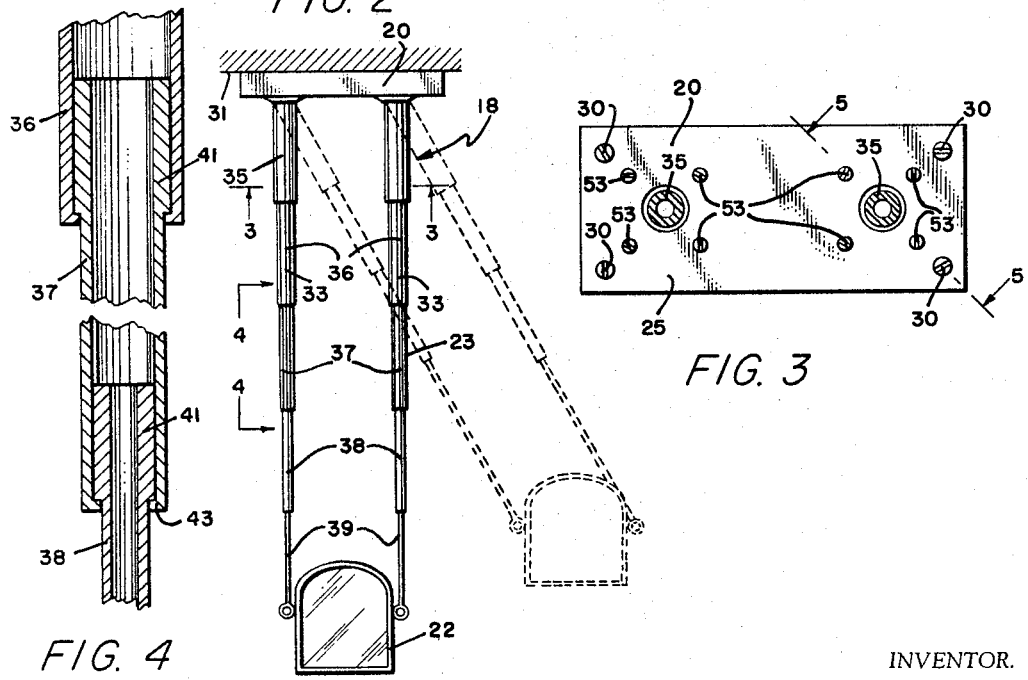
FIG. 2
FIG. 3
FIG. 4
INVENTOR.
WALTER H. LARSON
BY
*John H. Wilkinson*
ATTORNEY May 14, 1968 W. H. LARSON 3,383,082
DEPENDING RETRACTABLE MIRROR
Filed Jan. 24, 1966 2 Sheets-Sheet 2
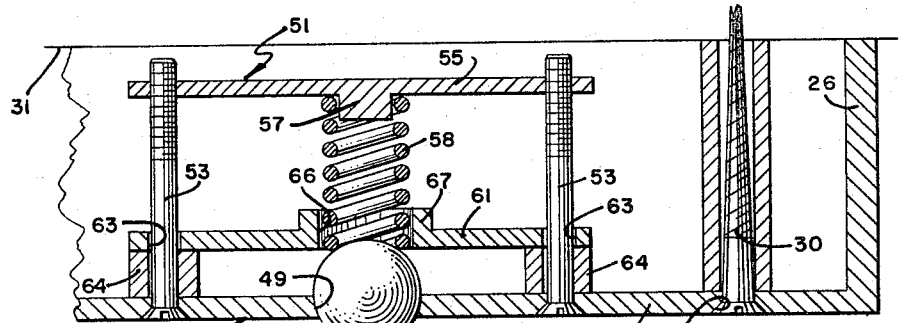
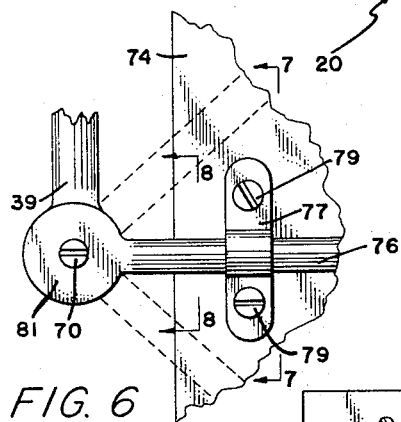
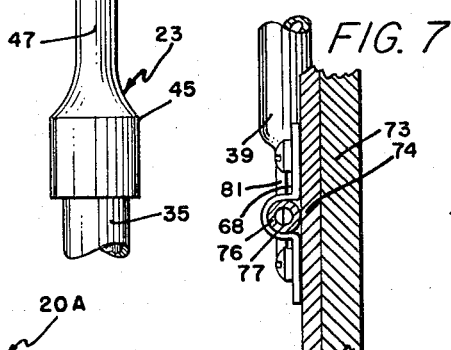
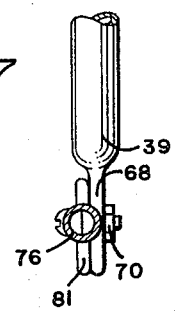
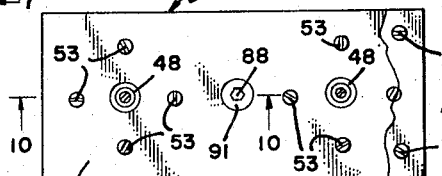
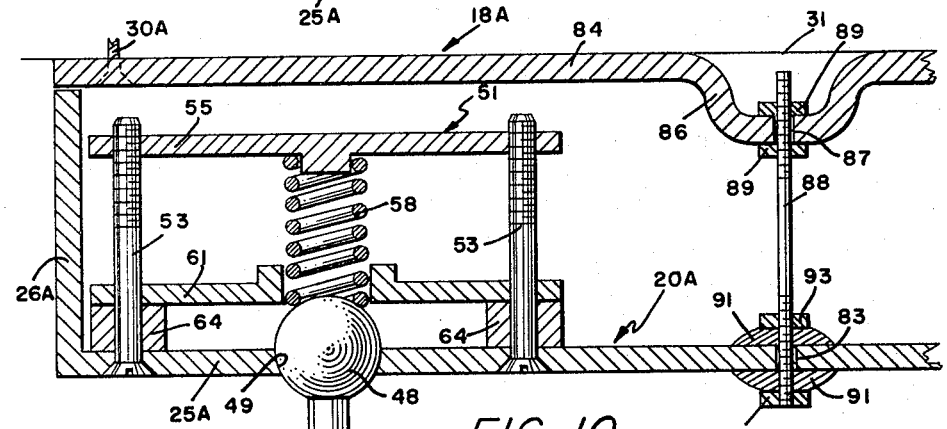
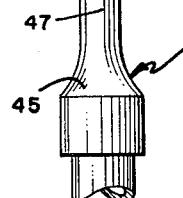
INVENTOR.
WALTER H. LARSON
BY
John H. Widdowson
ATTORNEY United States Patent Office 3,383,082
Patented May 14, 1968

3,383,082
DEPENDING RETRACTABLE MIRROR
Walter H. Larson, P.O. Box 64, Wichita, Kans. 67047
Filed Jan. 24, 1966, Ser. No. 522,686
4 Claims. (Cl. 248—495)

ABSTRACT OF THE DISCLOSURE

A mirror holder comprising a plate adapted for securing to the underside of a ceiling, longitudinally adjustable support members attached to the plate member, a mirror adjustably connected to the lower ends of the support members for pivotal and rotational movement whereby the mirror is adapted for movement in any direction relative to the plate member.

---

This invention relates to depending mirrors, and more particularly to a depending mirror adapted to be connected to a ceiling. Still more particularly, this invention relates to a depending mirror having telescoping or retractable support arms having upper ends thereof pivotally connected to a mounting means connectible to the ceiling and the lower ends thereof pivotally connected to a reflecting mirror means. Still more particularly, this invention relates to a depending mirror assembly having a reflecting plate or mirror surface that is movable in all directions so as to be adjustable to any desired position.

Various types of mirror assemblies either depending and/or retractable are known to the prior art. However, none of the prior art devices teach the use of a depending mirror assembly that is rotatable throughout 360 degrees and movable vertically and laterally in any direction. In accordance with the present invention, the depending mirror assembly includes a mounting means attachable to a supporting surface with a reflecting mirror means secured to the mounting means through elongated retractable support arms or means. The mounting means includes a plate member attachable to the supporting ceiling or surface by a plurality of screw members with the supporting means rotatable or pivotally connected to the plate member. A connecting or spring means is mounted on the plate member and includes a spring plate adapted to hold a spring member in pressing engagement with the upper end of the support means whereby the support means are frictionally held against the plate member in any adjusted position.

The support means preferably consist of a pair of elongated telescopic arm members having the upper ends thereof rotatable within the plate member and the lower ends thereof pivotally connected to the mirror means. The mirror means preferably consists of a rectangular shape reflecting plate member having a transverse supporting rod member rotatably connected to the back surface of the reflecting plate member by a pair of clamp elements. The opposite ends of the rod member are pivotally connected to respective ones of the elongated support arms by bolt members or the like.

It is seen, therefore, that the mirror means of the invention in its preferred specific embodiment is rotatably and pivotally connected to the support means and the support means is extendable and retractable whereby the mirror means is movable in any possible direction relative to the mounting means which is rigidly secured to the supporting surface. Therefore, it is seen that the mirror means can be moved vertically and laterally to any desired position whereby the person using the depending mirror assembly can position the mirror in any desired position so as to see the rear portion of the users head and the like.

In another preferred specific embodiment of the invention, a new and different type of mounting means is used whereupon the mirror means and the pivotally connected supporting means or arm members are secured to a first plate member which is rotatably connected to a second plate member that is rigidly secured as by screws and the like to the ceiling or supporting surface. The second preferred embodiment differs from the embodiment previously described in that the first plate means is rotatable relative to the supporting ceiling or surface whereby the mirror means is rotatable 360 degrees relative thereto to provide another dimension of adjustment to the depending mirror assembly.

Accordingly, it is an object of this invention to provide a new and novel depending mirror assembly.

Another object of this invention is to provide a new depending mirror assembly that is readily adjustable and movable to any desired operating position.

Still another object of the invention is to provide a depending mirror assembly having telescopic support arms connected to a reflecting mirror member which is pivotal and rotatable relative thereto.

One other object of this invention is to provide a depending mirror assembly having new and novel connecting and adjustment means whereby the reflecting mirror portion is movable in an effortless and smooth manner to any desired adjusted position.

Still another object of this invention is to provide a depending mirror assembly that is simple to use, economical to manufacture, and readily assembled and disassembled.

One other object of this invention is to provide a depending mirror assembly which is relatively inexpensive, attractive in appearance and has few moving parts.

Various other objects, advantages and features of the invention will become apparent to those skilled in the art from the following discussion taken in conjunction with the accompanying drawings in which:

FIG. 1 is a perspective view of a lady using a conventional mirror for applying make-up in conjunction with the depending mirror assembly of this invention;

FIG. 2 is a front elevational view of the depending mirror assembly of this invention secured to a supporting surface such as a ceiling or the like and illustrating in broken lines and adjusted position of the invention;

FIG. 3 is a sectional view taken along line 3—3 of FIG. 2;

FIG. 4 is a fragmentary foreshorten sectional view taken along line 4—4 of FIG. 2;

FIG. 5 is a fragmentary enlarged sectional view taken along line 5—5 of FIG. 3 illustrating the mounting means of this invention;

FIG. 6 is a fragmentary elevational view of the attachment means for connecting the reflecting mirror of this invention to an elongated support arm;

FIG. 7 is a sectional view taken along 7—7 of FIG. 6;

FIG. 8 is a sectional view taken along 8—8 of FIG. 6;

FIG. 9 is a sectional view similar to FIG. 3 illustrating a second embodiment of the mounting means of this invention; and FIG. 10 is an enlarged fragmentary sectional view taken along line 10—10 in FIG. 9.

The following is a discussion and description of preferred specific embodiments of the new depending mirror assembly of the invention, such being made with reference to the drawings, whereon the same reference numerals are used to indicate the same or similar parts and/or structure. It is to be understood that such discussion and description and drawings are not to unduly limit the scope of the invention.

Referring to the drawings, and in particular to FIG. 1, a depending mirror assembly indicated generally at 18, is illustrated as being used by a lady or the like in conjunction with a large wall or dressing mirror for the purposes of applying make-up, fixing the hair, and the like. The mirror assembly 18 is normally mounted in a position spaced outwardly from the large mirror so that the person using the mirrors can stand therebetween and use the reflection of the mirror assembly 18 on the large mirror to view the rear of the head.

As shown in FIG. 2, the depending mirror assembly 18 includes a mounting means 20 and a mirror means 22 interconnected by retractable support means 23. The mounting means 20 has a support plate 25 of rectangular shape having laterally extended sidewalls 26 about the outer periphery of the plate 25 to form a structure similar to a conventional shoe box lid. A hole 28 adjacent each corner of the support plate 25 is adapted to receive a screw 30 for securing the mirror assembly 18 to a supporting surface or ceiling 31 (FIG. 5).

The support means 23 consists of a pair of elongated support arms 33 each having a plurality of telescoping tube members 35–39, inclusive. As the tube members are of identical structure except for relative sizes, the tube member 37 need only be described in detail. As shown in FIG. 4, the tube member 37 has an upper laterally extended shoulder 41 adapted to slide in frictional engagement with the inner cylindrical surface of the adjacent upper tube member 36. The lower end of the tube member 37 has an inwardly turned flange 43 which engages the lower edge of the shoulder 41 of the tube member 38 to prevent disengagement of the tube members while permitting relative telescoping movement thereof.

The upper end of the tube member 35 is secured as by welding to a cap member 45 having a tapered neck portion 47 with a small end thereof welded to a ball member 48. The cap member 45 has a cylindrical body portion mounted about and welded to the tube member 35. The cap members 45 extend transversely of the plate 25 through spaced holes 49 therein. The holes 49 are of size slightly less than the diameter of the ball members 48 whereby the support arms 33 are supported by the contacting surfaces of the support plate 25 and the ball members 48. It is seen that the smaller neck portion 47 permits substantial angular movement of the support arms 33 for adjustment purposes.

In order to maintain the support arms 33 in an adjusted angular position relative to the plate 25, the mounting means 20 includes a spring and clamp assembly 51 secured to the plate 25 by bolts 53 and positioned above each ball member 48. As shown in FIG. 5, the spring and clamp assembly 51 includes a substantially square clamp plate 55 having a threaded hole adjacent each corner adapted to receive one of the bolts 53. Centrally of each clamp plate 55 is a downwardly extended projection 57 about which is mounted one end of a compression spring 58. The opposite ends of the springs 58 are mounted about the upper surface of a respective one of the ball members 48. It is seen that the compression springs 58 maintain a force against the ball members 48 which is transferred to the contacting surfaces of the support plate 25 whereby this pressure and frictional engagement maintains the support arms 33 in a selected adjusted position. The bolts 53 can be rotated to move the clamp plate 55 relative to the support plate 25 thereby adjusting the force of the compression springs 58 on the ball members 48.

A guide plate 61 similar in size to the clamp plate 55, has a hole 63 in each corner adapted to receive a respective one of the bolts 53. A spacer 64 is placed about each bolt 53 between the support plate 25 and the guide plate 61 to hold the same out of engagement with the ball members 48. Centrally of the guide plate 61 is an opening 66 having an upwardly extended sidewall 67 through which the springs 58 are extended. The guide plates 55 function to maintain the springs 58 vertically aligned with the ball members 48 and it is obvious that without the guide plate 61, the springs 58 would have a tendency to slip off the curved surfaces of the ball members 48 on rotation of the support arms 33. The opposite ends of the support arms 33 have the lower ends of the tube members 39 flattened to form connector sections 68. Each connector section 68 has a central hole adapted to receive a bolt member 70 for connection to the mirror means 22.

The mirror means 22 consists of a conventional mirror 72 of laminated construction having a glass 73 secured to a backing plate 74 with a reflective coating therebetween. An elongated support rod 76 is rotatably connected to the outer surface of the backing plate 74 by a pair of clamps 77, one of which is shown in FIG. 6. The clamps 77 have outer portions secured to the plate 74 by screws 79 and the interemdiate portions are mounted about the rod 76. The mirror 72 is rotatable about the rod 76 with the frictional engagement of the clamps 77 and the rod 76 holding the mirror plate in an adjusted position.

The opposite ends of the rod 76 are flattened to form attachment sections 81 having holes therein. The attachment sections 81 are in contact wtih the connector sections 68 of the support arms 33 and secured thereto by the bolt members 70 extended through the axially aligned holes. The attachment sections 81 and connector sections 68 are movable relative to each other about the bolt members 70 as shown in dotted lines in FIG. 6 thereby permitting angular adjustment relative to the support arms.

In the use and operation of the mirror assembly 18, the support plate 25 of the mounting means 20 is secured as by the screws 30 to the ceiling 31. The support arms 33 are axially movable for adjustment to the proper height requirement and angularly movable relative to the support plate 25. Additionally, the mirror 72 is rotatable about the rod 76 to achieve the proper reflection angle. It is seen in FIG. 2 that the connection of the support arms 33 with the rod 76 permits lateral or sideward movement of the mirror 72 and the mirror means 72 is movable to any position downwardly of the support plate 25 within the length limits of the telescoping tube members 35–39, inclusive.

In a second preferred embodiment of the invention, as shown in FIGS. 9 and 10, a mirror assembly 18a is substantially identical to the previously described mirror assembly 18 having the mirror means 22 connected to the support means 23 which in turn is connected to a ceiling mountable mounting means 20a. The new mounting means 20a has a support plate 25a with laterally extended sidewalls 26a about the periphery thereof with a centrally positioned connector hole 83. The ball members 48 of the support arms 33 are extended through spaced holes 49 in the plate 25a and connected thereto by the spring and clamp assemblies 51 as previously described.

The mounting means 20a further includes a mounting plate 84 having a hole adjacent each corner adapted to receive a screw 30a for securing the plate 25a to the ceiling 31. Centrally of the plate 84 is a downwardly depending projection 86 having a hole 87 therein. The support plate 25a is rotatably connected to the mounting plate 84 by a bolt member 88 extending through the holes 83 and 87 and threaded into nuts 89 welded on opposite sides of the projection 86. A pair of washers 91 are held in frictional contact of opposite sides of the support plate 25a by nuts 93 mounted ont he bolt 88 (FIG. 10).

In the use and operation of the mirror assembly 18a, the mirror means 22 is movable previously described, and in addition, is rotatable with the support plate 25a and interconnected support arms 33 through 360 degrees of rotation. The bolt member 88 can be rotated to move the sidewalls 26a of the support plate 25a into contact with the mounting plate 84 to provide a locking feature of this invention to hold the mirror assembly 18a in a selected rotational position.

It is apparent that the mirror assemblies can be made of any material such as plastic, aluminum, brass, etc. and it is preferred that the outer surfaces thereof be of a decorative material. Obviously, the support plate can be formed with a decorative design so as to resemble a conventional lamp fixture base.

As will be apparent from the foregoing description of the preferred embodiments of the applicant's depending mirror assemblies, relatively simple and inexpensive structures have been provided which are readily attachable to ceilings or other supporting surfaces. Applicant's construction provides a new and novel downwardly depending mirror assembly readily usable as an aid in fixing hairdos, applying make-up, and the like.

While the invention has been described in conjunction with preferred specific embodiments thereof, it will be understood that this description is intended to illustrate and not to limit the scope of the invention which is defined by the following claims.

I claim:

1. A depending mirror assembly comprising:
    (a) mounting means adapted for securing in an overhead position,
    (b) longitudinally adjustable support means,
    (c) means rotatably connecting said support means to said mounting means in a depending position when mounted in the overhead position,
    (d) mirror means,
    (e) means attaching said mirror means to said support means for pivotal and rotational movement whereby said mirror means is adapted for movement in any direction relative to said mounting means,
    (f) said mounting means having a support plate, a spring plate connected to said support plate by bolt members extended through said support plate and threadably mounted in said spring plate for horizontal movement of said spring plate relative to said support plate, and a spring member held by said spring plate,
    (g) said support means having a ball member secured to the upper end thereof, and
    (h) said ball member mounted within a hole in said support plate with said spring member engaging said ball member whereby said support means is rotatable relative to said support plate with frictional engagement under spring compression of said ball member and said support plate retaining said support means in an adjusted position, the spring compression readily adjustable by rotation of said bolt members that are readily accessible being in the outer lower side of said support plate.

2. A depending mirror assembly as described in claim 1, wherein:
    (a) said support means including a pair of identical spaced arm members having the upper ends thereof rotatably connected to said mounting means,
    (b) said mirror means having a plate member rotatably connected to a transversely extended rod member, and
    (c) said attaching means including bolt members connecting opposite ends of said rod member to respective one of said arm members whereby said plate member is rotatable about said rod member and pivotal about said arm members providing movement of said plate member vertically while maintaining the same horizontal position for ease of usage.

3. A depending mirror assembly as described in claim 2, wherein:
    (a) said arm members having a ball member secured to the upper ends thereof,
    (b) said mounting means including a plate member having a pair of spaced holes each adapted to receive one of said ball members, said holes smaller than said ball members,
    (c) said connecting means having said arm members extended transversely of said holes, respectively, whereby said arm members are supported by said plate member,
    (d) said mounting means having said spring plate operably connected to respective ones of said arm members and to said support plate by bolt members extended through the said support plate and threaded into said spring plates, and
    (e) said spring members held by said spring plates against said ball members under spring compression readily adjustably by rotation of said bolt members which are readily accessible being in the outer side of said support plate.

4. A depending mirror assembly as described in claim 3, wherein:
    (a) said support means having a pair of spaced arm members with the upper ends thereof rotatably connected to said second plate; and
    (b) said arm members having the lower ends thereof pivotally and rotatably connected to opposite sides of said mirror means whereby said mirror means is rotatable about said first plate, extendable and retractable on said arm members, and pivotal and laterally movable relative to said arm members.

References Cited

UNITED STATES PATENTS

| 52,531 | 2/1866 | Chappell | 248—495 |
| 1,263,783 | 4/1918 | Maier | 248—326 |
| 1,297,211 | 3/1919 | Magness | 248—326 X |

ROY D. FRAZIER, *Primary Examiner.*

J. F. FOSS, *Assistant Examiner.*